(12) United States Patent
Knobloch et al.

(10) Patent No.: US 7,966,887 B2
(45) Date of Patent: Jun. 28, 2011

(54) HIGH TEMPERATURE OPTICAL PRESSURE SENSOR AND METHOD OF FABRICATION OF THE SAME

(75) Inventors: Aaron Jay Knobloch, Mechanicville, NY (US); David William Vernooy, Niskayuna, NY (US); Weizhuo Li, Berkeley Heights, NJ (US); David Mulford Shaddock, Troy, NY (US); Stacey Joy Kennerly, Albany, NY (US)

(73) Assignee: General Electric Company, Niskayuna, NY (US)

( * ) Notice: Subject to any disclaimer, the term of this patent is extended or adjusted under 35 U.S.C. 154(b) by 272 days.

(21) Appl. No.: 12/411,878

(22) Filed: Mar. 26, 2009

(65) Prior Publication Data

US 2010/0242628 A1 Sep. 30, 2010

(51) Int. Cl.
*G01L 9/00* (2006.01)
(52) U.S. Cl. .......................... 73/705; 73/715
(58) Field of Classification Search .............. None
See application file for complete search history.

(56) References Cited

U.S. PATENT DOCUMENTS

| | | | |
|---|---|---|---|
| 4,703,175 A | 10/1987 | Salour et al. | |
| 4,712,004 A | 12/1987 | Spillman, Jr. | |
| 5,435,039 A * | 7/1995 | Taylor | 15/210.1 |
| 5,606,170 A | 2/1997 | Saaski et al. | |
| 5,929,990 A | 7/1999 | Hall | |
| 6,113,469 A * | 9/2000 | Yoshikawa et al. | 451/41 |
| 6,137,812 A * | 10/2000 | Hsu et al. | 372/6 |
| 6,612,174 B2 | 9/2003 | Sittler et al. | |
| 7,054,011 B2 | 5/2006 | Zhu et al. | |
| 2005/0062979 A1 | 3/2005 | Zhu et al. | |
| 2006/0283255 A1 | 12/2006 | Tilak et al. | |
| 2008/0106745 A1 | 5/2008 | Haber et al. | |
| 2008/0232745 A1 | 9/2008 | Knobloch et al. | |

FOREIGN PATENT DOCUMENTS

| | | |
|---|---|---|
| EP | 1026493 A2 | 8/2000 |
| WO | 2007/101426 A1 | 9/2007 |

OTHER PUBLICATIONS

W Peng, B. Qi, G. R. Pickrell, A. Wang; "Investigation on Cubic Zirconia-Based Fiber Optic Pressure Sensor for High Temperature Application"; 2003 IEEE; pp. 713-717.
"World's smallest high-temp pressure sensor"; Special Report: ECEs and Biomedicine; Apr. 2004; 1 Page.

* cited by examiner

*Primary Examiner* — Lisa M Caputo
*Assistant Examiner* — Jermaine Jenkins
(74) *Attorney, Agent, or Firm* — Scott J. Asmus

(57) ABSTRACT

A high-temperature pressure sensor is provided. The sensor includes a quartz substrate with a cavity etched on one side. A reflective coating is deposited on at least a portion of the cavity. The sensor further includes a ferrule section coupled to the quartz substrate with the cavity therebetween. The cavity exists in a vacuum, and cavity gap is formed between the reflective metal coating and a surface of the ferrule. The sensor also includes an optical fiber enclosed by the ferrule section and extending from the cavity gap to an opposing end of the ferrule section and a metal casing surrounding the ferrule section and the quartz substrate with an opening for said optical fiber extending therefrom. The pressure applied to the quartz substrate changes the dimensions of the cavity gap and a reflected signal from the reflective coating is processed as a pressure.

26 Claims, 5 Drawing Sheets

HIGH TEMPERATURE OPTICAL PRESSURE SENSOR AND METHOD OF FABRICATION OF THE SAME

BACKGROUND

Pressure sensors are used in a wide range of industrial and consumer applications. Pressures of many different magnitudes may be measured using various types of pressure sensors, such as Bourdon-tube type pressure sensors, diaphragm-based pressure sensors and piezoresistive pressure sensors on silicon or silicon on insulator (SOI). Several variations of the diaphragm-based pressure sensor have been utilized to measure different ranges of pressure, such as by utilizing cantilever-based pressure sensors, optically read pressure sensors and the like.

Fiber optic sensors utilizing a Fabry-Perot cavity have been demonstrated to be attractive for the measurement of temperature, strain, pressure and displacement, due to their high sensitivity. The major advantages of fiber optic sensors over conventional electrical sensors include immunity to electromagnetic interference (EMI), compatibility with harsh environments and potential for multiplexing.

Microelectro-mechanical systems (MEMS) fabrication techniques make Fabry-Perot sensors more attractive by the potential precision in achieving specific Fabry-Perot cavity depths, diaphragm thicknesses, and diameters. This reduces potential yield loss from "out of specification" parts and reduces the necessary accuracy of the interrogation optics. In comparison to electronic high temperature pressure sensors, Fabry-Perot optical sensors are ideal for use in harsh environments because they do not require electronics to be located in the high temperature, harsh environment. Typically, a piezoresistive or piezoelectric pressure sensor require electronics to be located in close proximity to reduce noise by amplifying the signal. At temperatures greater than 200° C., commercially available high temperature electronics are not available limiting the use of these sensors due to poor signal to noise ratios. For a Fabry Perot optical sensor, the electronics and optics for reading and converting the optical signal to an output voltage can be located in a cool region, allowing the use of commercially available components which can enable reduced cost and high accuracy.

Fiber optic sensors are also of great interest for application in avionics and aerospace applications because their immunity to EMI provides significant weight savings through the elimination of cable shielding and surge protection electronics. In the biomedical field, fiber optic sensors have also proven successful resulting from their reliability, biocompatibility and the simplicity of the sensor-physician interface.

BRIEF DESCRIPTION

In accordance with one exemplary embodiment of the present invention, a high-temperature pressure sensor is provided. The sensor includes a quartz substrate with a cavity etched on one side and a reflective coating deposited on at least a portion of the cavity. Further, a ferrule section is coupled to the quartz substrate with the cavity therebetween, wherein said cavity exists in a vacuum. A cavity gap is formed between the reflective metal coating and a surface of the ferrule. The sensor further includes an optical fiber enclosed by the ferrule section and extending from the cavity gap to an opposing end of the ferrule section; and a metal casing surrounding the ferrule section and the quartz substrate with an opening for the optical fiber extending therefrom. Further, the pressure applied to said quartz substrate changes the dimensions of the cavity gap and a reflected signal from the reflective coating is processed as a pressure.

In accordance with another exemplary embodiment of the present invention, a high-temperature pressure sensor is provided. The sensor includes a first quartz substrate with a cavity etched on one side and a reflective coating deposited on at least a portion of the cavity. The sensor also includes, a second quartz substrate bonded to the first quartz substrate with the cavity therebetween. The cavity exists in a vacuum and a cavity gap is formed between said reflective metal coating and a surface of the second quartz substrate. Further, a ferrule section is coupled to the second quartz substrate and an optical fiber is enclosed by the ferrule section and extending from the second quartz substrate to an opposing end of the ferrule section. A metal casing is provided surrounding the ferrule section and the first and the second quartz substrates with an opening for said optical fiber extending therefrom. Further, the pressure applied to said quartz substrate changes the dimensions of the cavity gap and a reflected signal from the reflective coating is processed as a pressure.

In accordance with another exemplary embodiment of the present invention, a method of forming a pressure sensor is provided. The method includes providing a quartz substrate having a top side and a bottom side and etching the quartz substrate to form a cavity. The method further includes depositing a reflective coating on at least a portion of the cavity and attaching a ferrule section to the quartz substrate with the cavity therebetween wherein a cavity gap is formed between the reflective metal coating and a surface of the ferrule. The method also includes enclosing an optical fiber inside the ferrule section and extending from the cavity gap to an opposing end of the ferrule section and placing a metal casing around the ferrule section and the quartz substrate with an opening for said optical fiber extending therefrom.

In accordance with another exemplary embodiment of the present invention, a method of forming a pressure sensor is provided. The method includes providing a first quartz substrate having a top side and a bottom side and etching the first quartz substrate to form a cavity. The method further includes depositing a reflective coating on at least a portion of the cavity and bonding a second quartz substrate to the first quartz substrate with the cavity therebetween, wherein a cavity gap is formed between the reflective metal coating and a surface of the second substrate. The method also includes attaching a ferrule section to the second quartz substrate, enclosing an optical fiber inside the ferrule section and extending from the cavity gap to an opposing end of the ferrule section and placing a metal casing around the ferrule section and the quartz substrate with an opening for said optical fiber extending therefrom.

DRAWINGS

These and other features, aspects, and advantages will become better understood when the following detailed description is read with reference to the accompanying drawings in which like characters represent like parts throughout the drawings, wherein.

DETAILED DESCRIPTION

The present description relates generally to pressure sensors, and more particularly to pressure sensors for measuring pressures at high temperatures. Embodiments of the invention include a novel high temperature optical sensor based on an extrinsic Fabry-Perot interferometer (EFPI) and method of manufacturing the same.

Figure 1:
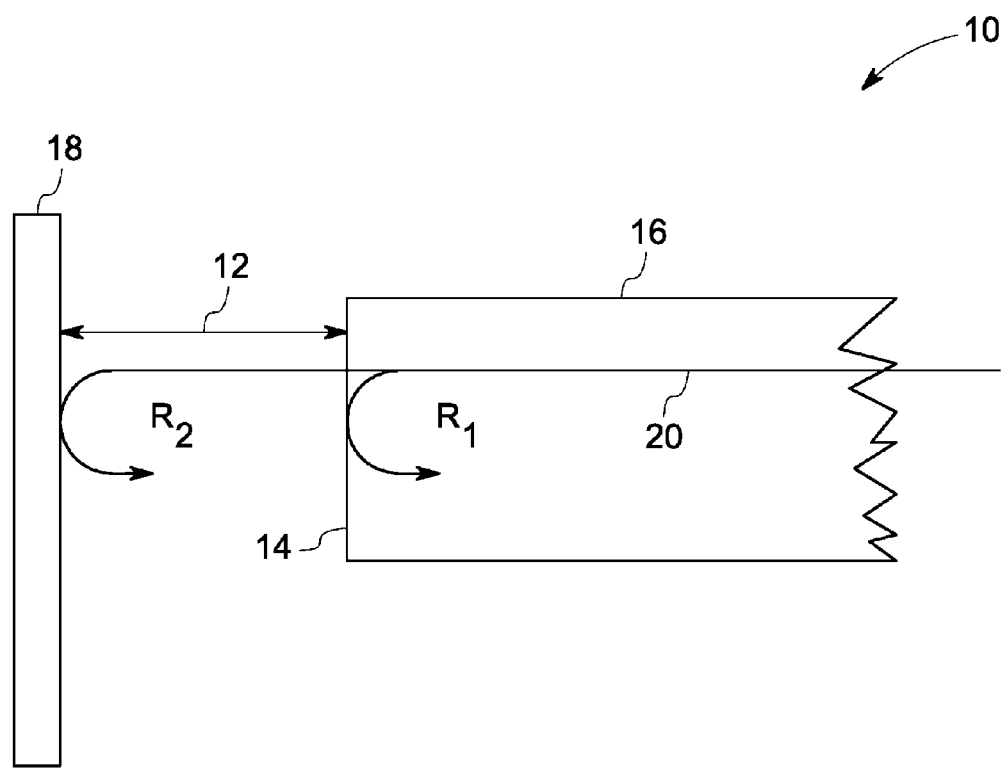
FIG. 1 is a diagrammatical representation of an extrinsic Fabry-Perot interferometer based pressure sensor.

FIG. 1 is a conceptual view of an EFPI based pressure sensor 10. The pressure sensor 10 uses a distance measurement technique based on the formation of a low-finesse Fabry-Perot cavity 12 between a polished end face 14 of a fiber 16 and a reflective surface of a diaphragm 18. A light signal 20 is passed through the fiber 16, where a first portion of the light R1 is reflected off the fiber/air interface. The remaining light propagates through the air gap between the fiber and the reflective surface and a second portion of the light R2 is reflected back into the fiber 16.

In one embodiment, a light emitting diode (LED) (not shown) may generate the light signal to interrogate the sensor. In another embodiment, other light sources, such as superluminescent leds (SLEDS), lasers or broadband light sources may also be used. The interaction between the two light waves R1 and R2 in the Febry-Perot cavity is modulated by the path length of each wave. As will be appreciated by those skilled in the art, the path length is defined as the distance that a light wave travels in the cavity 12. The reflected light waves are detected by a detector (not shown) where the signals are demodulated to produce a distance measurement. As the cavity distance 12 changes, the demodulated signal from the detector determines the pressure. The cavity distance 12 can change if the diaphragm 18 translates due to an external force such as, but not limited to, an external pressure. Several different demodulation methods exist to convert the return signal into a distance measurement.

Figure 2:
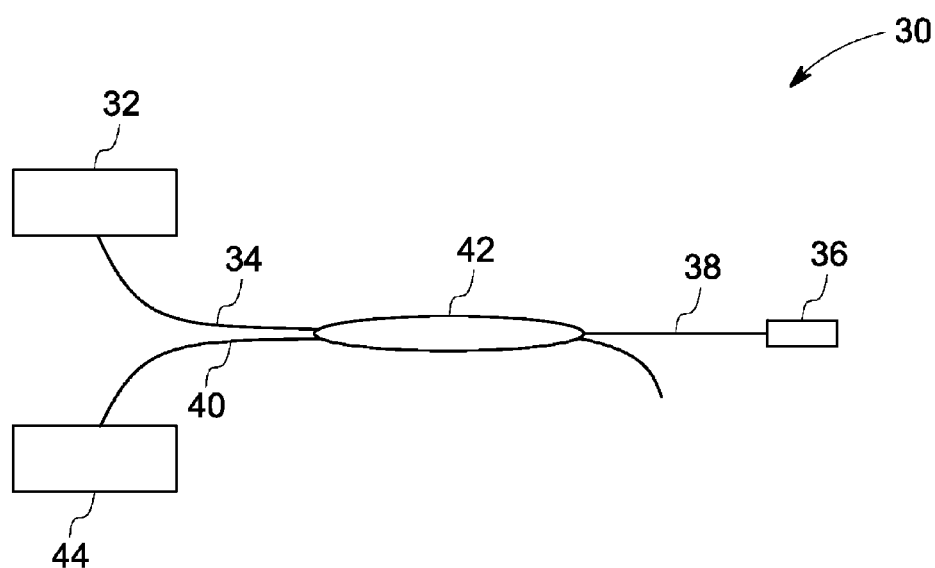
FIG. 2 is a diagrammatical representation of a basic demodulation system using a single wavelength interrogation.

FIG. 2 shows a basic demodulation system 30 using single wavelength interrogation. A light source 32 supplies coherent light 34 to the sensor head 36 through an optical fiber cable 38 and the reflected light 40 is detected at the second leg of an optical fiber coupler 42 by a detector 44. To illustrate the concept, a simplified analysis will ignore multiple reflections and the output of the detector is approximated as a low finesse Fabry-Perot cavity in which the intensity at the detector $I_r$ is given by $$I_r = |A_1 + A_2|^2 = A_1^2 + A_2^2 + 2A_1A_2 \cos \Delta\phi \quad (1);$$

where, $A_1$ and $A_2$ are the amplitudes of light waves R1 and R2, and $\Delta\phi$ is the phase difference between them. A more detailed analysis will account for multiple reflections within the cavity, and the need for this analysis is dictated by the relative magnitude of the reflections involved.

The output $I_r$ is a sinusoid with a peak-to-peak amplitude and offset that depends on the relative intensities of R1 and R2. A phase change of 360 degrees in the sensing reflection corresponds to one fringe period. In one embodiment, if a source wavelength of 1.3 µm is used, the change in gap for one fringe period is 0.65 µm. Thus, by tracking the output signal, minute displacements are determined. As will be appreciated by those skilled in the art, the above demodulation approach is just an exemplary one and other demodulation schemes such as dual wavelength interrogation may also be used. A potential disadvantage of this type of demodulation system is the non-linearity of the sinusoidal transfer function. If the sensor gap is not biased at the zero crossing of the sinusoid, but is incorrectly biased near a peak or valley, the sensitivity of the detection system may be severely degraded.

Figure 3:
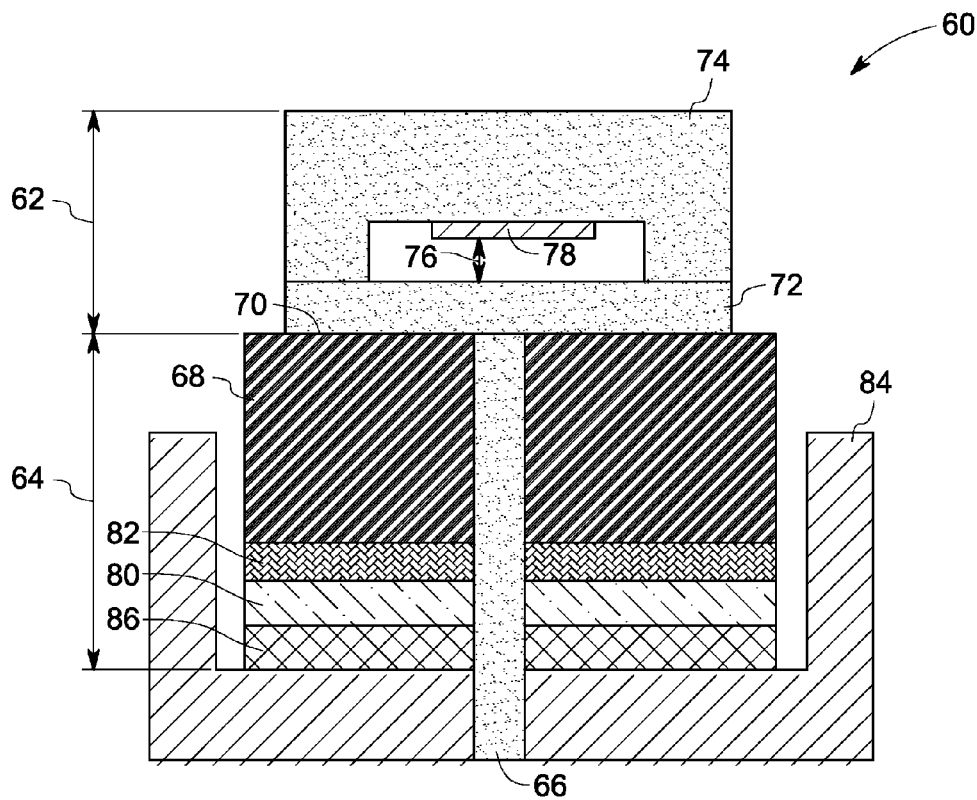
FIG. 3 is a diagrammatical representation of a sensor system for measuring pressure, in accordance with one embodiment of the present invention.

FIG. 3 is a sensor system 60 for measuring pressure in accordance with one embodiment. The sensor system 60 consists of a sensor section 62 and a sensor assembly 64. An optical fiber 66 is fixed inside a ferrule 68 such as by using laser welding, a direct bonding process, a high temperature adhesive or another high-temperature compatible process. In one example, the fiber diameter is 125 microns. One side 70 of the fiber-ferrule structure is then polished using standard fiber polishing processes. The polishing ensures a planar surface for mounting the sensor assembly 64. The sensor section 62 is attached to the signal detection system 64 on the polished surface 70 of the fiber-ferrule structure.

The sensor section 62 is composed of a first substrate 72 and a second substrate 74. In one embodiment, the first substrate 72 is made of quartz or fused silica material and the second substrate 74 is made of quartz or fused silica. A cavity gap 76 is formed between the first substrate 72 and the second substrate 74. The use of quartz or fused silica for the second substrate 74 by itself may lead to a low intensity light reflection from the substrate and consequently, a low signal-to-noise ratio. Hence, in one embodiment, a metal coating 78 is disposed on the second substrate 74 and into the cavity gap 76 to increase the reflectivity of the Fabry-Perot cavity allowing a higher percentage of light to be reflected back. Another advantage of the metal coating is it eliminates "ghost" or secondary reflections from the back of the sensor. In one embodiment, a roughened surface, a curved surface, an absorbing surface or an anti-reflective (AR)-coated surface may be placed on the back of the sensor to eliminate secondary reflections. In one exemplary embodiment, the metal coating 78 may be a gold metal coating. In yet another embodiment, the material used for metal coating 78 comprises platinum, titanium, chrome, silver or any other high temperature compatible metal.

The second substrate 74 of sensor section 62 acts as diaphragm and translates the applied force or pressure into a variation in the cavity gap depth 76. In one embodiment, the cavity gap is formed by etching the second substrate. In another embodiment, oxide wet etching or reactive ion etching is used for etching the second substrate. The first substrate 72 and the second substrate 74 are then attached to one another through a bonding process to create a vacuum in the cavity gap. In one embodiment, the vacuum bonding process includes a laser melting process or surface activated bonding process. The vacuum bond ensures that the expansion effects of any residual gas inside the cavity gap due to increasing temperature do not result in unwanted variations in cavity gap. Further, the vacuum bond isolates the cavity gap 76 from the applied pressure such that there is a differential pressure that results in a deflection of the diaphragm.

The signal detection system 64 further includes a strain buffer material 80 attached to the opposite side of the ferrule 68. The strain buffer material 80 is attached to the ferrule 68 by using a metal bond material 82. In one embodiment the strain buffer 80 and the ferrule 68 are bonded using thermo-compression bonding, diffusion bonding, or other welding processes with or without the bond material 82. The strain buffer material 80 is typically a high temperature compatible material with a coefficient of thermal expansion (CTE) between that of the low CTE ferrule 68 and a high CTE outer metal casing 84. The outer metal casing 84 encloses the signal detection system 64 and forms the sensor system 60. In one embodiment, the metal casing 84 may extend to entire perimeter of the signal detection system 64 and the sensor section 62. In one embodiment, the strain buffer material 80 is silicon nitride. The metal bond material 82 in one embodiment is deposited on the strain buffer material 80 and the ferrule 68 through a standard metallization process. In one example, the metallization process may be evaporation, sputtering or electroplating. In another embodiment, the composition of the bond material 82 is gold, platinum or alloys containing one high melting point element. The strain buffer material 80 in this example is attached to the metal casing through a braze layer 86. In one embodiment, the braze layer 86 may be an active brazing alloy. In another embodiment, the strain buffer 80 is metallized to facilitate brazing. In yet another embodiment, a material such as nickel may be used for metallization.

It should be noted here that material choices for the substrates and coatings are important for limiting the cavity gap variation due to temperature. If the cavity gap changes due to temperature, it becomes more difficult to differentiate between the cavity gap variations due to pressure and the cavity gap variations due to temperature. Thus, in one embodiment, low coefficient of thermal expansion (CTE) materials such as quartz/fused silica may be used for substrates and coatings to form the cavity gap. This minimizes the intrinsic temperature coefficient of the cavity gap over the extended operating range of the sensor.

Figure 4:
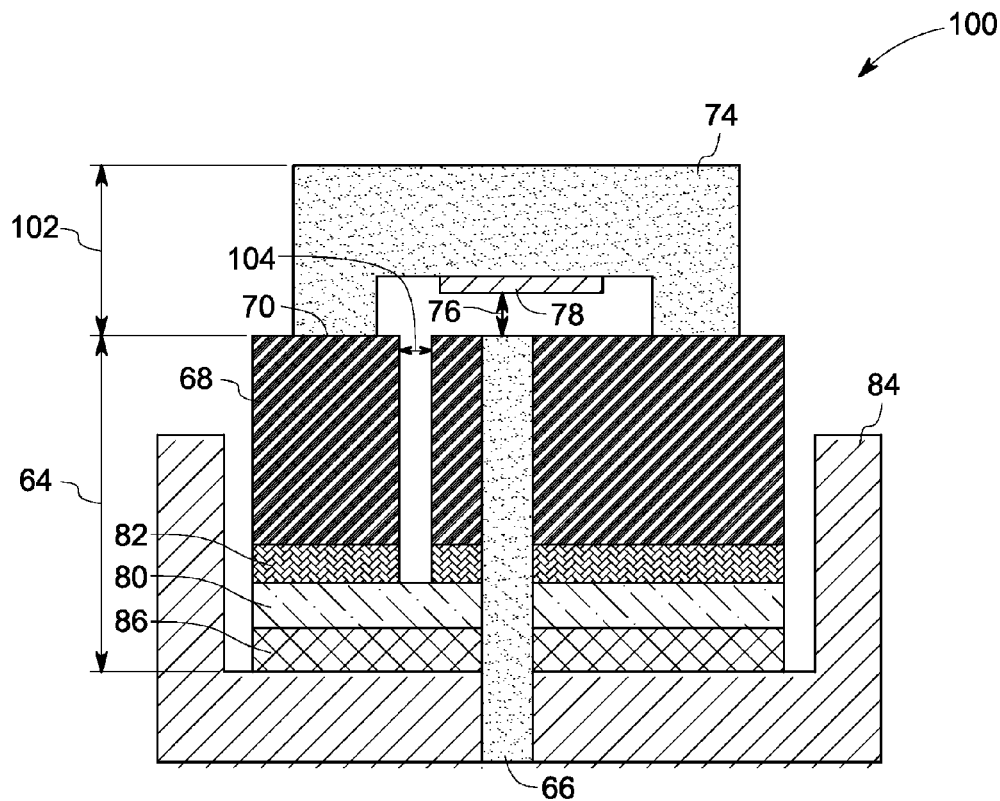
FIG. 4 is a diagrammatical representation of another high temperature sensor system of measuring pressure, in accordance with an embodiment of the present invention.

FIG. 4 is another embodiment of the high temperature pressure sensor system 100. The high temperature pressure sensor 102 of sensor system 100 is similar to the sensor 62 of FIG. 3. However, the middle interface substrate 72 of FIG. 3 is eliminated in sensor 102. The advantage of this sensor design is it reduces the divergence of light and minimizes the possibility of creating a second fabry-perot cavity. It also removes a bonding step from the assembly process of the sensor. In this embodiment, a hole 104 is formed inside the ferrule 68. The hole 104 is covered during the vacuum bonding process where the strain buffer material 80 is attached to the ferrule 68. It should be noted here that in one embodiment, the sensor 102 may be used to measure an absolute pressure. In one embodiment, the vacuum bonding process is performed to eliminate temperature expansion of any gas trapped in cavity gap 76. In another embodiment, the cavity gap is about 1.25 microns and the thickness of the metal coating is about 175 nm. In yet another embodiment, the thickness of the second substrate 74 is 300 microns and the diameter of the etched cavity 76 is 1800 microns to create a 100 nm deflection at a pressure of 250 pounds per square inch (psi). It should be noted here that these are exemplary parameters and can be modified depending on the desired pressure range of the sensor.

As described earlier in FIG. 1, in one embodiment a light signal is passed through the optical fiber 66. A part of the light signal hits the glass fiber—air interface and returns back as the first reflected signal R1. A second part of the light further hits the cavity gap—metal coating interface and returns back as the second reflected signal R2. The cavity gap 76 varies with the diaphragm 74 or the quartz substrate deflection, which in turn varies with applied pressure. The second reflected signal R2 changes according to the variation in the cavity gap. The reflected signals are detected by a detector and analyzed to measure the pressure.

Figure 5:
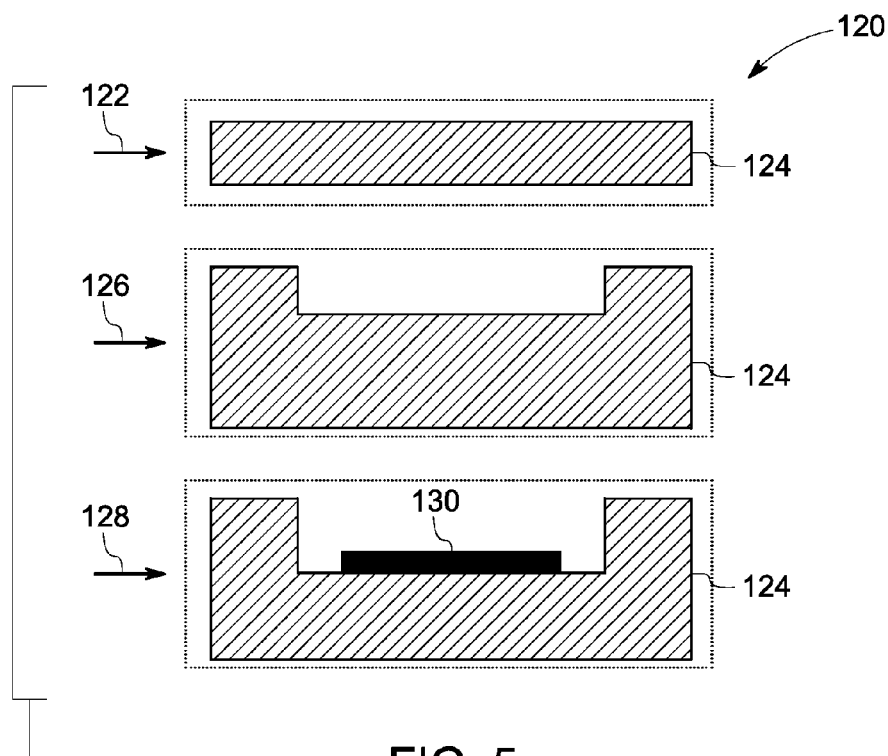
FIG. 5 is a diagrammatical representation of an exemplary process of manufacturing the pressure sensor of FIG. 4, in accordance with one embodiment of the present invention.

FIG. 5 describes a process 120 of manufacturing the sensor 102 of FIG. 4. At step 122, a first quartz wafer 124 of the sensor 102 is formed. The thickness of the quartz wafer depends on the relationship between the pressure and deflection. At step 126, the wafer 124 is patterned such as by using standard photoresist and lithographic processes with the geometry of the diaphragm. The quartz wafer 124 is then etched to define the diaphragm diameter and the cavity gap depth. In one embodiment, a buffered oxide etching or reactive ion etching is used to etch the quartz wafer 124. At step 128, a thin metal reflective coating 130 is deposited onto the wafer diaphragm covering at least a portion of the diaphragm and in some examples the entire diaphragm surfaces including the sidewalls. In one embodiment, the deposition process includes an evaporation process or a sputtering process. The metal coating in one example is patterned such that it only remains in the center portion of the diaphragm. In one embodiment, the patterning of the metal coating is performed by reactive ion etching process or by a lift-off process. As will be appreciated by those skilled in the art, the lithography process or the etching processes described here are exemplary one and other similar processes are in scope of the present invention.

Figure 6:
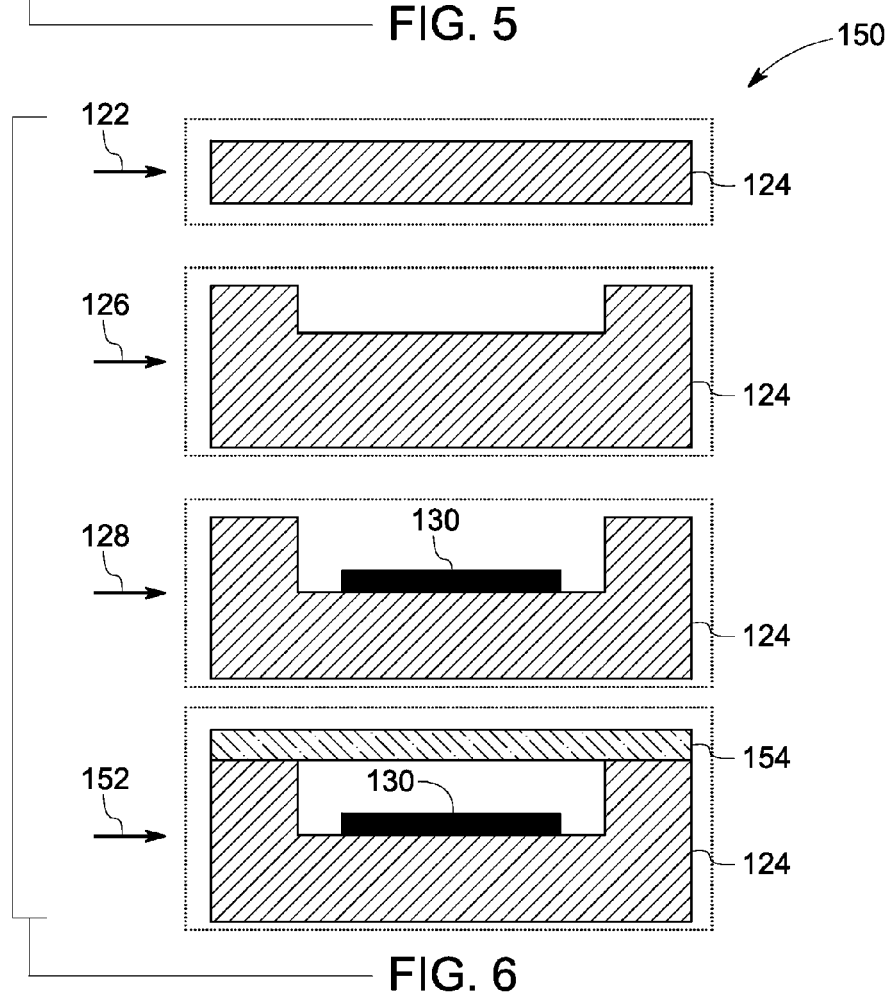
FIG. 6 is a diagrammatical representation of an exemplary process of manufacturing the pressure sensor of FIG. 3, in accordance with one embodiment of the present invention.

FIG. 6 describes the process 150 of manufacturing the sensor 62 of FIG. 3. The process 150 is similar to the earlier process 120 of FIG. 5. However, an additional step 152 is incorporated in this process. As described earlier, the sensor 102 is formed at step 128. A second quartz substrate 154 is then thermally bonded to the quartz wafer using chemically activated quartz bonding techniques or quartz laser welding techniques. Thus, forming the sensor 62 comprising the first quartz substrate 124, the metal coating 130 and the second quartz substrate 154.

Figure 7:
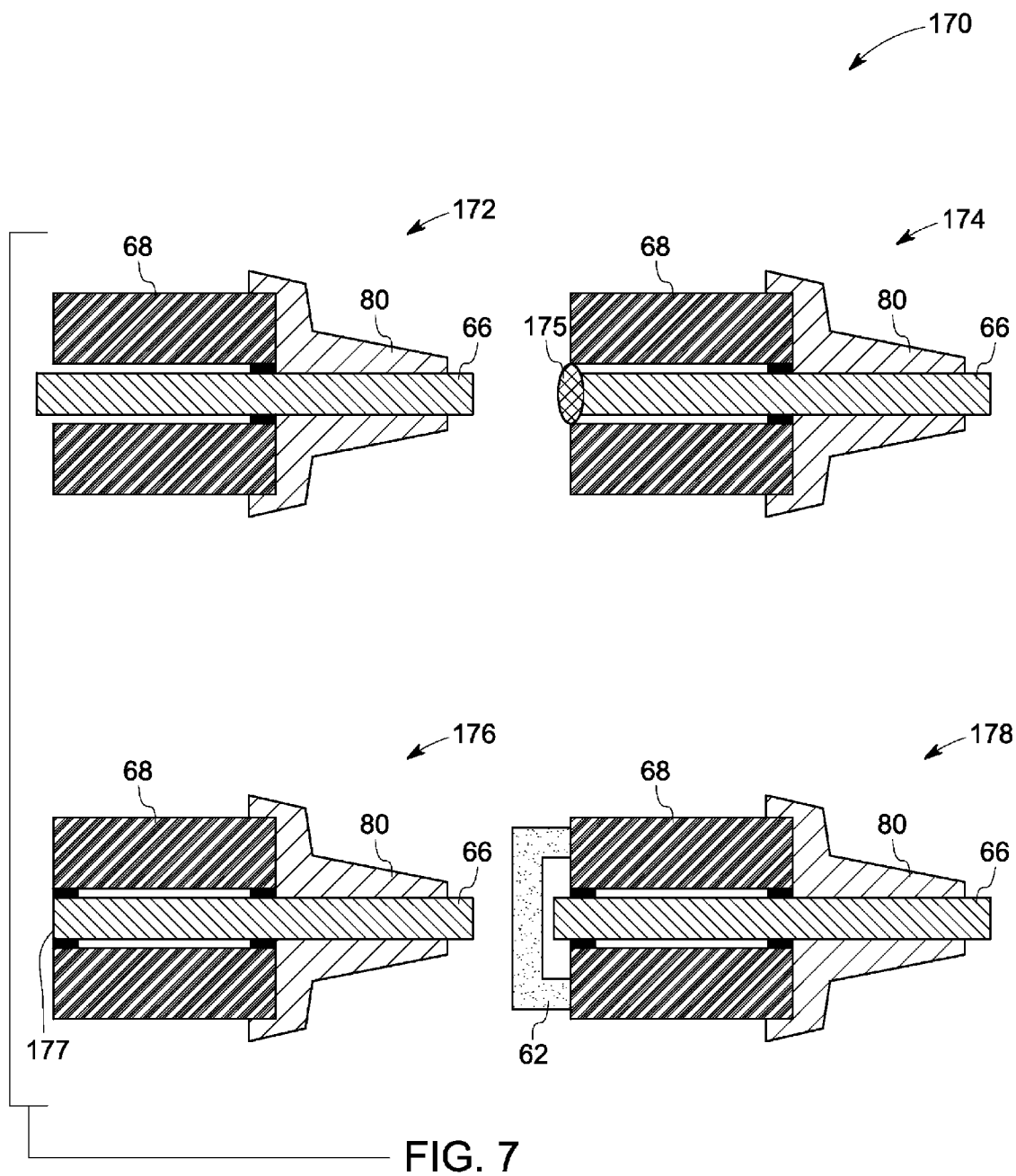
FIG. 7 is a diagrammatical representation of an exemplary process of manufacturing an optical fiber-ferrule structure, in accordance with one embodiment of the present invention.

FIG. 7 describes one exemplary process 170 for assembly of the optical fiber-ferrule structure. At step 172, the fiber 66 is inserted into the ferrule 68 such that a small distance protrudes from the opposing front end. A laser welding or an adhesive attachment process is then used to fix the fiber 66 to the rear portion of ferrule 68. The protective strain buffer 80 is slipped over the fiber and temporally attached to the rear surface of the ferrule. The protective strain buffer 80 strengthens the assembly for subsequent steps in the process. In step 174, a laser is used to form a ball of melted glass 175 from the protruding fiber and attach the fiber 66 to the front face of the ferrule. In one embodiment, instead of melting the fiber, a bonding glass with similar coefficient of expansion and refractive index may be melted to form the joint between the protruding fiber and ferrule. In step 176, the front face 177 of the ferrule is polished such that ferrule surface and fiber surface are coincident. In step 178, the sensor section 62 is attached to the fiber-ferrule structure through a laser welding process or a chemically activated bonding process.

Figure 8:
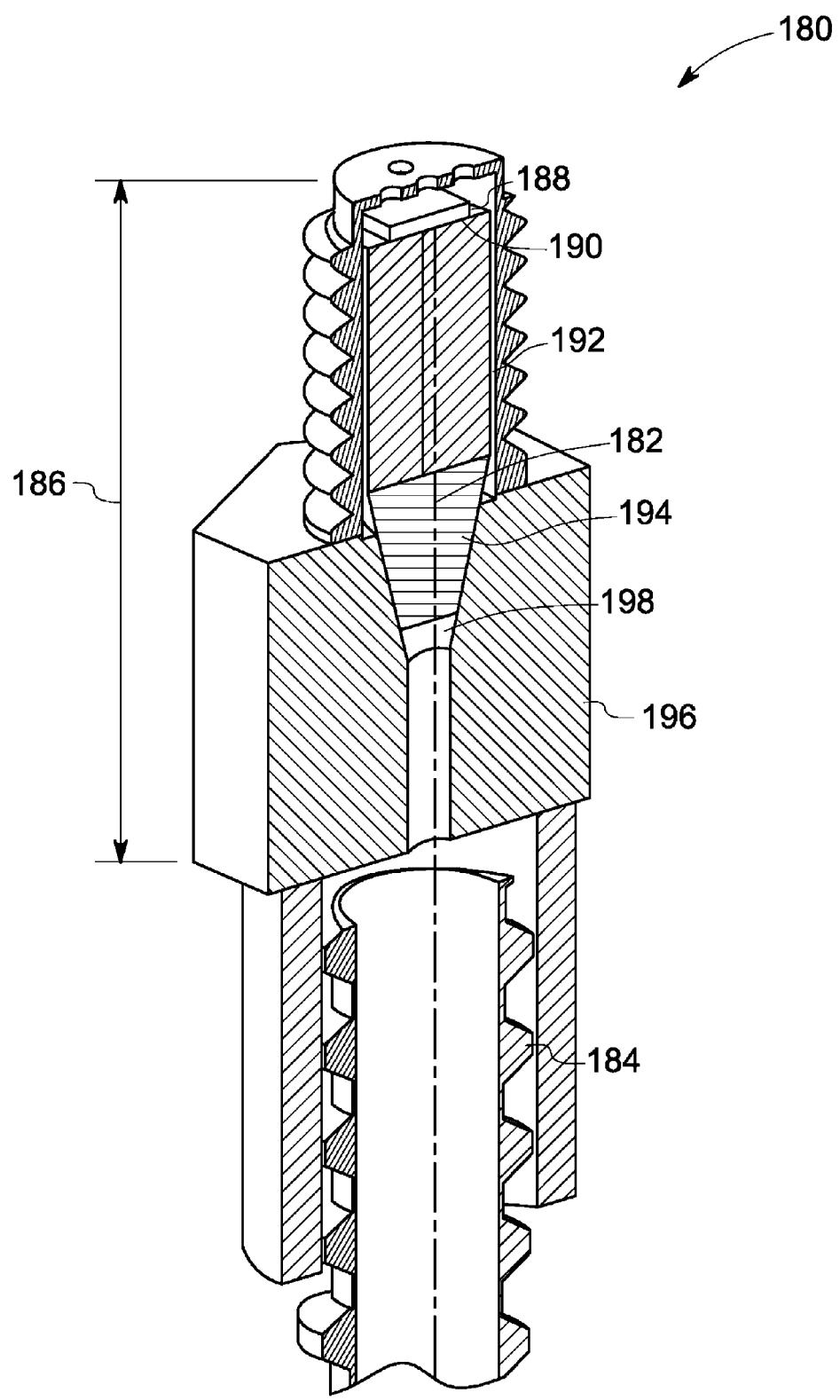
FIG. 8 is a diagrammatical representation of 3-dimensional view of the pressure sensor of FIG. 3, in accordance with one embodiment of the present invention.

FIG. 8 is one example of a 3-dimensional view of the entire assembly 180 of the high temperature pressure sensor system 60 of FIG. 3. An optical fiber 182 is passed through a flexible conduit 184 to a sensor assembly section 186. The sensor assembly section 186 includes a quartz diaphragm 188 that is fixed to a top side 190 of ferrule 192. As described earlier in FIG. 3 the fiber 182 is fixed inside ferrule 192 and a strain buffer 194 is attached to one side of the ferrule 192. The strain buffer 194 is then attached to a metal housing 196 through a braze layer 198.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A high-temperature pressure sensor, comprising
a quartz substrate with a cavity etched on one side;
a reflective coating deposited on at least a portion of said cavity;
a ferrule section coupled to said quartz substrate with said cavity therebetween, wherein said cavity exists in a vacuum, and wherein a cavity gap is formed between said reflective metal coating and a surface of said ferrule;
an optical fiber enclosed by said ferrule section and extending from said cavity gap to an opposing end of said ferrule section; and
a metal casing surrounding said ferrule section and said quartz substrate with an opening for said optical fiber extending therefrom,
wherein pressure applied to said quartz substrate changes the dimensions of the cavity gap and a reflected signal from the reflective coating is processed as a pressure.

2. The sensor of claim 1, wherein the quartz substrate comprises a fused silica substrate.

3. The sensor of claim 1, wherein the reflective coating is selected from a platinum coating, a gold coating, a titanium coating, a chrome coating and combinations thereof.

4. The sensor of claim 1, wherein a thickness of the reflective coating is about 150 nm.

5. The sensor of claim 1, wherein the sensor is operable at temperatures up to and beyond 700 degree celcius.

6. The sensor of claim 1, wherein the cavity depth is about 1.25 microns.

7. The sensor of claim 1 further comprising a strain buffer material attached between the ferrule and the metal casing.

8. The sensor of claim 7, wherein the strain buffer material is attached using thermocompression bonding.

9. The sensor of claim 8, wherein thermocompression bonding is performed in a vacuum atmosphere.

10. The sensor of claim 7, wherein the strain buffer material is attached to the metal casing through a braze layer.

11. The sensor of claim 7, wherein the strain buffer material comprises metallized strain buffer material.

12. The sensor of claim 7, wherein the ferrule comprises metallized ferrule.

13. The sensor of claim 7, wherein the strain buffer material comprises high temperature compatible material.

14. The sensor of claim 7, wherein the strain buffer has a coefficient of thermal expansion between that of the ferrule material and the metal casing material.

15. A high temperature pressure sensor comprising:
a first quartz substrate with a cavity etched on one side;
a reflective coating deposited on at least a portion of said cavity;
a second quartz substrate bonded to said first quartz substrate with said cavity therebetween, wherein said cavity exists in a vacuum, and wherein a cavity gap is formed between said reflective metal coating and a surface of said second quartz substrate;
a ferrule section coupled to said second quartz substrate;
an optical fiber enclosed by said ferrule section and extending from said second quartz substrate to an opposing end of said ferrule section; and
a metal casing surrounding said ferrule section and said first and second quartz substrates with an opening for said optical fiber extending therefrom,
wherein pressure applied to said first quartz substrate changes the dimensions of the cavity gap and a reflected signal from the reflective coating is processed as a pressure.

16. The sensor of claim 15, wherein the first quartz substrate and the second quartz substrate comprises a fused silica substrate.

17. The sensor of claim 15, wherein the reflective coating is selected from a platinum coating, a titanium coating, a chrome coating and combinations thereof.

18. A method of forming a pressure sensor, the method comprising:
providing a quartz substrate having a top side and a bottom side;
etching the quartz substrate to form a cavity;
depositing a reflective coating on at least a portion of said cavity;
attaching a ferrule section to said quartz substrate with said cavity therebetween wherein a cavity gap is formed between said reflective metal coating and a surface of said ferrule;
enclosing an optical fiber inside said ferrule section and extending from said cavity gap to an opposing end of said ferrule section; and
placing a metal casing around said ferrule section and said quartz substrate with an opening for said optical fiber extending therefrom.

19. The method of claim 18, wherein depositing the reflective coating comprises patterning the reflective coating.

20. The method of claim 19, wherein patterning the reflective coating comprises reactive ion etching process or lift-off process.

21. The method of claim 18, wherein depositing the reflective coating comprises sputtering, e-beam or evaporation methods.

22. The method of claim 18, wherein the etching comprises buffered oxide etching or reactive ion etching.

23. A method of forming a pressure sensor, the method comprising:
providing a first quartz substrate having a top side and a bottom side;
etching the first quartz substrate to form a cavity;
depositing a reflective coating on at least a portion of said cavity;
bonding a second quartz substrate to the first quartz substrate with said cavity therebetween, wherein a cavity gap is formed between said reflective metal coating and a surface of said second substrate;
attaching a ferrule section to said second quartz substrate;
enclosing an optical fiber inside said ferrule section and extending from said second quartz substrate to an opposing end of said ferrule section; and
placing a metal casing around said ferrule section and said first and second quartz substrates with an opening for said optical fiber extending therefrom.

24. The method of claim 23, wherein the etching comprises buffered oxide etching or reactive ion etching.

25. The method of claim 23, wherein the bonding comprises laser welding or chemically activated bonding.

26. The method of claim 23, wherein the bonding comprises vacuum bonding.

* * * * *